(12) United States Patent
Haslam et al.

(10) Patent No.: US 11,770,152 B2
(45) Date of Patent: Sep. 26, 2023

(54) RADIO FREQUENCY (RF) LOCATION BEACON WITH TUNABLE ANTENNAS AND CLOUD INTEGRATION

(71) Applicant: Apptricity Corporation, Irving, TX (US)

(72) Inventors: Michael E. Haslam, Arlington, TX (US); Weimin Peng, Plano, TX (US)

(73) Assignee: Apptricity Corporation, Irving, TX (US)

( * ) Notice: Subject to any disclaimer, the term of this patent is extended or adjusted under 35 U.S.C. 154(b) by 36 days.

(21) Appl. No.: 17/634,072

(22) PCT Filed: Jul. 27, 2020

(86) PCT No.: PCT/US2020/043748
§ 371 (c)(1),
(2) Date: Feb. 9, 2022

(87) PCT Pub. No.: WO2021/206744
PCT Pub. Date: Oct. 14, 2021

(65) Prior Publication Data
US 2022/0352919 A1 Nov. 3, 2022

Related U.S. Application Data

(60) Provisional application No. 63/006,595, filed on Apr. 7, 2020.

(51) Int. Cl.
*H04B 7/00* (2006.01)
*H04B 1/40* (2015.01)
(52) U.S. Cl.
CPC ..................... *H04B 1/40* (2013.01)
(58) Field of Classification Search
CPC ....................................................... H04B 1/40
(Continued)

(56) References Cited

U.S. PATENT DOCUMENTS 5,633,875 A 5/1997 Hershey et al.
6,249,227 B1 6/2001 Brady et al.
(Continued)

FOREIGN PATENT DOCUMENTS

CA 2985243 2/2017
EP 1188115 B1 8/2006
(Continued)

OTHER PUBLICATIONS

International Searching Authority: Notification of Transmittal of International Search Report, Written Opinion of Int'l Searching Authority, or the Declaration dated Dec. 23, 2020.
(Continued)

*Primary Examiner* — April G Gonzales
(74) *Attorney, Agent, or Firm* — HEMINGWAY & HANSEN, LLP; D. Scott Hemingway; Elizabeth P. Hartman

(57) ABSTRACT

Disclosed herein is a Radio Frequency Location and/or Proximity Beacon receiver/transmitter with one or more tunable antennas and power levels and having the capability for cloud integration. Disclosed herein is a communication system utilizing a Radio Frequency Location and/or Proximity Beacon receiver/transmitter with one or more tunable antennas and power levels and having the capability for cloud integration. The communication system supports processing of communications regarding a radio frequency (RF) beacon for tracking location and/or proximity of field assets. Disclosed herein is a method of using a Radio Frequency Location and/or Proximity Beacon receiver/transmitter with one or more tunable antennas and power levels and having the capability for cloud integration. The method transmits communications regarding a radio frequency beacon for tracking location and/or proximity of field assets.

25 Claims, 6 Drawing Sheets

(58) Field of Classification Search
USPC .......................................................... 455/77
See application file for complete search history.

(56) References Cited

U.S. PATENT DOCUMENTS

| | | |
|---|---|---|
| 6,687,609 B2 | 2/2004 | Hsiao et al. |
| 6,977,612 B1 | 12/2005 | Bennett |
| 7,072,668 B2 | 7/2006 | Chow |
| 7,099,770 B2 | 8/2006 | Naden et al. |
| 7,518,502 B2 | 4/2009 | Austin et al. |
| 7,895,131 B2 | 2/2011 | Kraft |
| 7,928,844 B2 | 4/2011 | Mackenzie et al. |
| 8,223,009 B2 | 7/2012 | Anderson et al. |
| 8,239,251 B2 | 8/2012 | Wellman |
| 8,339,251 B2 | 12/2012 | Roberts, Sr. et al. |
| 8,890,683 B2 | 11/2014 | Schnitz et al. |
| 9,082,102 B2 | 7/2015 | Taylor et al. |
| 9,111,433 B2 | 8/2015 | Curatolo et al. |
| 9,362,630 B2 | 6/2016 | Goswani |
| 9,456,302 B2 | 9/2016 | Skomra et al. |
| 9,519,921 B2 | 12/2016 | Wei et al. |
| 9,591,441 B2 | 3/2017 | Kuhl et al. |
| 9,633,576 B2 | 4/2017 | Reed |
| 9,635,518 B2 | 4/2017 | Lee et al. |
| 9,641,964 B2 | 5/2017 | Kulkarni et al. |
| 9,723,552 B2 | 8/2017 | Farley et al. |
| 9,756,684 B2 | 9/2017 | Tammisetti |
| 2006/0187026 A1* | 8/2006 | Kochis ............... G08B 21/0269 340/539.13 |
| 2007/0046467 A1* | 3/2007 | Chakraborty ........... H04B 1/22 340/572.1 |
| 2010/0228585 A1* | 9/2010 | Bradley ................. G06Q 40/03 705/317 |
| 2011/0282235 A1* | 11/2011 | Collins ................ A61B 5/4872 600/547 |
| 2012/0070158 A1* | 3/2012 | Allee ................... G06K 19/027 375/259 |
| 2012/0127976 A1* | 5/2012 | Lin .................... G06K 17/0022 340/10.4 |
| 2013/0060351 A1* | 3/2013 | Imming ................ H04W 4/029 700/13 |
| 2014/0291405 A1* | 10/2014 | Harkes ............. G06K 19/07749 235/492 |
| 2016/0379165 A1* | 12/2016 | Moakley ............ G06Q 10/0833 705/333 |
| 2017/0031840 A1* | 2/2017 | Cawse .................. H04W 4/027 |
| 2017/0083857 A1* | 3/2017 | Barton ............... G06Q 10/0833 |
| 2017/0123285 A1* | 5/2017 | Suzuki ................ G02F 1/133345 |
| 2017/0126285 A1* | 5/2017 | Hamilton ................. H03H 7/40 |
| 2017/0208426 A1* | 7/2017 | Komoni .................. H04W 4/80 |
| 2018/0176723 A1* | 6/2018 | Klimek ................ H04B 17/318 |
| 2018/0317049 A1* | 11/2018 | Rittman ............... H01Q 1/2225 |
| 2019/0304278 A1* | 10/2019 | Lu ....................... G08B 13/1436 |
| 2023/0133890 A1* | 5/2023 | Haslam ............... A61M 5/3129 604/181 |

FOREIGN PATENT DOCUMENTS

| | | |
|---|---|---|
| JP | 2018-182514 | 11/2018 |
| KR | 1020170134016 | 12/2017 |

OTHER PUBLICATIONS

International Searching Authority: International Search Report dated Dec. 23, 2020.
International Searching Authority: Written Opinion of the International Searching Authority dated Dec. 23, 2020.
"The Internet of Things Architecture", 1 TU-T Draft: Study Period 2013-2016, International Communication Union, Geneva; CH, vol. m2m, Jun. 27, 2012, pf 1-144, XP044097902, para 3.1.3.1, 4.2.3, 4.2.6, 5.2.2, 5.3.3.1.

* cited by examiner

RADIO FREQUENCY (RF) LOCATION BEACON WITH TUNABLE ANTENNAS AND CLOUD INTEGRATION

RELATED APPLICATION DATA

This application claims the benefit of U.S. Provisional Application No. 63/006,595, filed Apr. 7, 2020, which is incorporated by reference into this utility patent application.

TECHNICAL FIELD OF THE INVENTION

This invention relates to a Radio Frequency (RF) beacon with tunable antennas and integration with a cloud-based tracking system.

BACKGROUND OF THE INVENTION

Computers and computer networks have transformed the society and the work environment since their introduction in mass to the business community and the consuming public. The impact we see today on the way business is conducted and consumers interact with service providers and product retailers is rooted in the technological developments in the recent past.

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high-tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

In the 1960s, the Defense Department developed a communication system that would permit communication between these different computer networks. The Defense Department recognized that developing a centralized communication system would be vulnerable to attacks or sabotage, so the Defense Department required that their new communication system be decentralized with no critical services concentrated in vulnerable failure points. In order to achieve this goal, the Defense Department established a decentralized communication protocol for communication between their computer networks.

A few years later, the National Science Foundation (NSF) established a communication system that facilitated communication between incompatible network computers at various research institutions across the country. The NSF adopted the Defense Department's protocol for communication, and this combination of research computer networks would eventually evolve into the Internet.

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. User Datagram Protocol (UDP) is a connectionless protocol that works like TCP without requiring the error-checking and recovery services required for TCP. UDP does not establish a connection before sending data and will continuously send datagrams to a recipient whether or not the datagrams are received. TCP is used in applications requiring high data reliability, such as World Wide Web (HTTPS), Secure Shell (SSH), File Transfer Protocol (FTP) and Email. UDP is used for applications requiring speed and efficiency, such as VPN tunneling, Domain Name Systems, Voice over IP, Trivial File Transfer Protocol (TFTP), live broadcasts, video streaming and games. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

The Internet protocols were originally developed with an assumption that Internet users would be connected to a single, fixed network. With the advent of cellular wireless communication systems, such as mobile communication devices, the movement of Internet users within a network and across network boundaries has become common. Mobile communications and cellular telephony systems have become smaller, lighter, and more powerful, which improved the ability to communicate with individuals on an exponential basis. Because of this highly mobile Internet usage, the implicit design assumption of the Internet protocols (e.g. a fixed user location) is violated by the mobility of the user. This violation led to the creation of mobile communication protocols that use a combination of digital and analog signals to send data for mobile devices.

The IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will normally be associated with a single Mobile Node home network for IP addressing purposes. The home network has a Home Agent and the foreign network has a Foreign Agent—both of which control the routing of information packets into and out of their network.

The Mobile Node usually keeps the Home Agent informed of its current location by registering a care-of address with the Home Agent, and a care-of address represents the current foreign network where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address. This tunneling is a type of communications protocol that facilitates movement of data between networks. The Foreign Agent may also participate in informing the Home Agent of the Mobile Node's current care-of address. The Foreign Agent can de-tunnel information packets for the mobile node after the information packets have been forwarded to the Foreign Agent by the Home Agent. Further, the Foreign Agent serves as a default router for out-going information packets generated by the mobile node while connected to the foreign network.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

Mobile communication systems have used radio frequency identification tags and devices to track and monitor vehicles and other items, and these systems and methods allow for the communication between a host computer and a plurality of transponders (or beacons) through one or more interrogator units, which are devices that request data from the transponders. Transponder or beacon are electronic devices that receives an interrogation (radio frequency signal) and transmits a signal in response to the received signal.

In an IP-based mobile communications system, the Mobile Node changes its point of attachment to the network while maintaining network connectivity. Most Mobile IP Protocols used today assume that mobile IP communications with a Mobile Node will be performed on a single administrative domain or a single network controlled by one administrator. When a Mobile Node travels outside its home administrative domain, however, the Mobile Node must communicate through multiple domains in order to maintain network connectivity with its home network. While connected to a foreign network controlled by another administrative domain, network servers must authenticate, authorize and collect accounting information for services rendered to the Mobile Node.

Wireless communication systems could include multi-band radio architectures, systems capable of spectrum re-farming and software defined radio systems. Common system components in a wireless communication system, such as an IP-based mobile system, include at least one mobile node (or user equipment) and at least one access point AP or a base station on a wireless communication system. The various components on these systems may be called different names depending on the nomenclature used on any particular network configuration or communication system.

For the purposes of this application, the term "mobile node" refers to an Internet-connected device whose location or Internet attachment point may be changed frequently, and includes mobile communication units, mobile terminals, smart phones, transponders, beacons or nomadic devices, such as laptop PCs with wireless connectivity. A mobile node or user equipment also encompasses PCs having cabled (e.g., telephone line (twisted pair), Ethernet cable, optical cable, and so on) connectivity to the wireless network, as well as wireless connectivity directly to the cellular network, as can be experienced by various makes and models of mobile terminals (cell phones) having various features and functionality, such as Internet access, e-mail, messaging services, and the like.

Mobile nodes may sometimes be referred to as user equipment, mobile unit, mobile terminal, mobile device, or similar names depending on the nomenclature adopted by particular system providers. A receiver and transmitter is located at each access point (AP), base station, or mobile node. As such, terms such as transmitter or receiver in the present invention are not meant to be restrictively defined, but could include components on each mobile communication unit or transmission device located on the network.

Several patents and patent publications show traditional methods of using computer networks and mobile connectivity for fleet managements and tracking assets, such as the following: (1) US Patent Publication No. 20170208426 published Jul. 20, 2017 to Komoni et al.; (2) US Patent Publication No. 2017/0031840 published Feb. 2, 2017 to Cawse; (3) US Publication No. 2016/0379165 published Dec. 29, 2016 to Moakley; (4) US Publication No. 2010/0228585 published Sep. 9, 2010 to Bradley; (5) U.S. Pat. No. 9,756,684, issued Sep. 5, 2017 to Tammisetti; (6) U.S. Pat. No. 9,723,552, issued Aug. 1, 2017 to Farley; (7) U.S. Pat. No. 9,641,964 issued May 2, 2017 to Kulkarni et al.; (8) U.S. Pat. No. 9,635,518 issued Apr. 25, 2017 to Lee et al.; (9) U.S. Pat. No. 9,633,576 issued Apr. 25, 2017 to Reed; (10) U.S. Pat. No. 9,591,441 issued Mar. 3, 2017 to Kuhl; (11) U.S. Pat. No. 9,519,921 issued Dec. 13, 2016 to Wei et al.; (12) U.S. Pat. No. 9,456,302 issued Sep. 27, 2016 to Skomra et al.; (13) U.S. Pat. No. 9,111,433 issued on Aug. 18, 2015 to Curatolo; (14) U.S. Pat. No. 9,082,102 issued on Jul. 14, 2015 to Taylor et al.; (15) U.S. Pat. No. 8,890,683 issued Nov. 18, 2014 to Schnitz et al.; (16) U.S. Pat. No. 8,339,251 issued on Dec. 25, 2012 to Roberts Sr. et al.; (17) U.S. Pat. No. 8,239,251 issued Aug. 7, 2012 to Wellman; (18) U.S. Pat. No. 8,223,009 issued Jul. 17, 2012 to Anderson et al.; (19) U.S. Pat. No. 7,928,844 issued Apr. 19, 2011 to Mackenzie et al.; (20) U.S. Pat. No. 7,895,131 issued Feb. 22, 2011 to Kraft; (21) U.S. Pat. No. 7,518,502 issued Apr. 14, 2009 to Austin et al.; (22) U.S. Pat. No. 7,099,770 issued Aug. 29, 2006 to Naden et al.; (23) U.S. Pat. No. 7,072,668 issued Jul. 4, 2006 to Chow; (24) U.S. Pat. No. 6,977,612 issued Dec. 20, 2005 to Bennett; (25) U.S. Pat. No. 6,687,609 issued Feb. 3, 2004 to Hsiao et al.; (26) U.S. Pat. No. 6,249,227 issued Jun. 19, 2001 to Brady et al.; and (27) U.S. Pat. No. 5,633,875 issued May 27, 1995 to Hershey et al.

Prior art communication systems, including the above prior art methods and systems (including known radio frequency wireless communication systems and methods) are not optimized to adequately operate in the mobile environment with efficiency nor do they effectively and efficiently utilize the capabilities of the radio frequency wireless communication systems to communicate and track assets. There is no present system that satisfactorily correlates and associates various features and capabilities of the mobile communication system to provide fully integrated, feature rich, and built-in data and information sharing with a maximum number of multiple input-output ports.

Radio frequency (RF) wireless communication capabilities have become an integral part of personal devices and cellular network phones and devices. Given the wide adoption of RF Radio Module standards and the proliferation of Radio frequency wireless communication capable devices, it is desired to have radio receivers/transmitter beacons that are tunable with control over both short and long ranges, where long range can be tens of kilometers. It is additionally desired to have fine control over transmit and receive sensitivity, efficiency and functionality in order to adapt to a wide variety of use cases.

Asset tracking can be accomplished with Radio Beacons that transmit location data over cellular network connections or over satellite network connections. However, these active network connections typically carry subscription and data charges. It is desired to have an asset tracking radio beacon that avoids or minimizes these charges. It also is desired to have a radio beacon that transmits over various ranges, optimizing battery performance to the use case. It is additionally desired to have a communication system that can utilize the capabilities of radio frequency wireless communication capable devices and tunable radio beacons for asset management and tracking. And, it is further desired that the radio frequency wireless communication be cloud integrated for tracking proximity and location.

SUMMARY OF THE INVENTION

Disclosed herein is an Integrated Radio Frequency Location and/or Proximity Beacon, with one or more antennas wherein the antennas are tunable for range and sensitivity. The range is additionally adjustable with data transmission rates and with power settings, either in steps, continuously over a range, or both. The flexibility of multiple adjustment techniques allows for receivers and transmitters to be targeted at specific use cases. Transmit and receive antennas may be separate for distinct tuning of transmit and receive range, or the transmit and receive capabilities be combined in a unified antenna.

The radio module can optionally incorporate Global Positioning System (GPS) for location determination and time determination. The beacon is optionally integrated into Cloud system for tracking proximity and location.

Disclosed herein is an Integrated Radio Frequency Location and/or proximity Beacon with one or more antennas where those antennas are tunable for range and sensitivity and that range is additionally adjustable with data transmission rates and with power settings either in steps or continuously over a range or both. The flexibility of multiple adjustment techniques allows for receivers and transmitters to be targeted at specific use cases. Transmit and receive antennas may be separate for distinct tuning of transmit and receive range. The beacon can optionally incorporate GPS for location determination and time determination. The beacon is optionally integrated into Cloud system for tracking proximity and location.

The invention disclosed herein is a radio frequency location and/or proximity beacon having one or more radio frequency module that transmits and receives information via radio frequency signals. The radio frequency module has a transmission portion that transmits presence information including date, time and a unique beacon ID, location and/or proximity data, location data including latitude, longitude and altitude, and proximity data being detection of other beacons in range, and has a receive portion that receives programming instructions and/or detection of other devices in proximity to the beacon, wherein programming instructions are received from an integrated device and/or cloud environment. The programming instructions can be new programing, updates to existing programming, or initiation of prior programed tasks. The RF location beacon has a central controller that holds beacon programming, directs beacon transmit/receive operations, integrates beacon components, and sets power level, data rate and transmit/receive duration.

The RF location beacon also has one or more tunable antennas that can be tuned for efficiency and sensitivity for transmitting and receiving signals. The one or more tunable antennas can be two or more separate antennas, with at least one transmit antenna and at least one receive antenna, or can be a unified transmit/receive antenna. There are one or more matching-tuning networks, where the matching-tuning network is situated between the RF module and each tunable antenna, and tunes power, efficiency and sensitivity of the antenna using controller input. The tunable power levels, allow for tuning the power level to adjust transmit or receive range for the beacon. The RF beacon also has one or more sensors that transmit and receive data using radio transmission.

The radio frequency module transmission of the RF location beacon utilizes one or more wireless personal area network (WPAN), wireless local area network (WLAN) or wireless wide area network (WWAN) radio frequency communication standards at the physical layer. The radio frequency the radio frequency module transmission can utilize standards-based radio frequency communication and non-standards based radio frequency communication. Standards-based radio frequency communication can be one or more of Bluetooth, LoRa, Wireless USB, WiFi, UWB, and ZigBee.

The radio frequency location and/or proximity beacon may include a GPS module, a GPS antenna and a GPS matching tuning network. The radio frequency location and/or proximity beacon may also have one or more power amp for power amplification or de-amplification capabilities, where the power amp is controlled by programed controller logic, switch activation, or receipt of instructions. The radio frequency location and/or proximity beacon may have one or more switch for power, light, sound, signaling and combinations thereof, where the one or more switch is capable of being controlled by said central controller. The data transmitted and received by the beacon may be encrypted. Data transmitted by the beacon is received by one or more radio frequency receiving device that may include a computer, tablet computer, pad computer, laptop computer, mobile phone, handheld mobile device, or a dedicated radio frequency receiving device.

The invention disclosed herein is communication system supporting processing of communications regarding a radio frequency (RF) beacon for tracking location and/or proximity of field assets having a first computer server on a home network, said first computer server having one or more hardware data processors with functionality to receive and process tracking, location and proximity information signals relating to field assets. The first computer server is coupled to a first database for storing and maintaining information relating to the field assets and the first computer server is coupled to a home agent and a first gateway server for communication outside the home network. The communication system has one or more radio frequency location and/or proximity beacon associated one or more stationary or moveable field asset. The radio frequency location beacon has one or more radio frequency module that transmits and receives information via radio frequency. The radio frequency module has a transmission portion that transmits presence information including date, time and a unique beacon ID, location and/or proximity data. The location data includes latitude, longitude and altitude, and the proximity data includes detection of other beacons in range. The radio frequency module has a receive portion that receives programming instructions and/or detection of other devices in proximity to the beacon. The programming instructions are received from an integrated device and/or cloud environment. The programming instructions can include new programing, updates to existing programming, or initiation of prior programed tasks. The RF location beacon also has a central controller that holds beacon programming, directs beacon transmit/receive operations, integrates beacon components, and sets power level, data rate and transmit/receive duration.

The RF location beacon further has one or more tunable antennas that can be tuned for efficiency and sensitivity for transmitting and receiving signals. The one or more tunable antennas can be two or more separate antennas, with at least one transmit antenna and at least one receive antenna, or can be a unified transmit/receive antenna. There is one or more matching-tuning network situated between the RF module and each tunable antenna, that tunes power, efficiency and sensitivity of the antenna using controller input; and tunable power levels, where tuning the power level will adjust the beacon transmit or receive range for the beacon. The RF location beacon also has one or more sensors that transmit and receive data using radio transmission signals.

The disclosed communication system also has one or more radio frequency receiving device having application programing to receive radio frequency signals from the radio frequency location and/or proximity beacon. The radio frequency receiving device receives presence, location and proximity signals transmitted from said radio frequency location and/or proximity beacon, and the radio frequency receiving device relays presence, location and proximity data received from the radio frequency location and/or proximity beacon to the first computer server. The radio frequency receiving device can be one or more of a computer, tablet computer, pad computer, laptop computer, mobile phone, handheld mobile device, or a dedicated radio frequency receiving device.

The communication system further may include a base-station transceiver unit coupled to the home network that can receive transmissions from one or more beacons. The communication system further may include a second computer server on a foreign network. The second computer server may be coupled to the radio frequency receiving device, and the radio frequency receiving device may be coupled to a second gateway server for communication outside the foreign network. The radio frequency receiving device receives radio transmitted signals from one or more beacon, each of beacon being associated with a field asset and the radio frequency receiving device using the radio transmitted signals transmits tracking, location and status information signals that are communicated to the first computer server on the home network.

The RF beacon in the communication system optionally includes a GPS module, a GPS antenna and a GPS matching tuning network. The RF beacon in the communication system optionally includes one or more power amp for power amplification or de-amplification capabilities that can be controlled by programed controller logic, switch activation, or receipt of instructions. The RF beacon in the communication system optionally includes one or more switch for power, light, sound, signaling and combinations thereof, said one or more switch capable of being controlled by the central controller. RF beacon in the communication system utilizes one or more wireless personal area network (WPAN), wireless local area network (WLAN) or wireless wide area network (WWAN) radio frequency communication standards at the physical layer. The radio frequency module transmission optionally utilizes standards-based radio frequency communication, including one or more of Bluetooth, LoRa, Wireless USB, WiFi, UWB, and ZigBee.

Disclosed herein is a method of transmitting communications regarding a radio frequency beacon for tracking location and/or proximity of field assets, having the steps of: (1) providing a first computer server on a home network. The first computer server is coupled to a first database and a first gateway, and the first computer server has one or more hardware data processors; (2) supporting communications to and from the home network using the first gateway server; (3) providing one or more radio frequency location and/or proximity beacon associated with one or more stationary or moveable field asset, (4) providing a radio frequency receiver device that has application programming to receive transmissions from the beacon, said radio frequency receiving device is a computer, tablet computer, pad computer, laptop computer, mobile phone, handheld mobile device, or a dedicated radio frequency receiving device; (5) receiving, by said radio frequency receiver device, radio frequency transmitted signals from the beacon, (6) relaying beacon transmissions received by the radio frequency receiver device to the first computer server, and (7) storing received transmissions in said database.

The beacon used in the method has one or more radio frequency module that transmits and receives information via radio frequency signals. The radio frequency module has a transmission portion that transmits presence information that may include date, time and a unique beacon ID, location and/or proximity data, the location data includes latitude, longitude and altitude, and the proximity data includes detection of other beacons in range. The radio frequency module also has a receive portion that receives programming instructions and/or detection of other devices in proximity to the beacon, where programming instructions are received from an integrated device and/or cloud environment. The programming instructions may be new programing, updates to existing programming, or initiation of prior programed tasks. The RF location beacon has a central controller that holds beacon programming, directs beacon transmit/receive operations, integrates beacon components, and sets power level, data rate and transmit/receive duration.

The RF location beacon has one or more tunable antennas that can be tuned for efficiency and sensitivity for transmitting and receiving signals. The one or more tunable antennas can be two or more separate antennas, with at least one transmit antenna and at least one receive antenna, or a unified transmit/receive antenna. There is one or more matching-tuning network situated between the RF module and each tunable antenna, that tunes power, efficiency and sensitivity of the antenna using controller input, and has tunable power levels, where tuning the power level will adjust the beacon transmit or receive range for the beacon; and one or more sensors capable of transmitting and receiving data using radio transmission.

The RF location beacon optionally has a GPS module, a GPS antenna and a GPS matching tuning network. The RF location beacon also optionally has one or more power amp for power amplification or de-amplification capabilities, where the power amp is controlled by programed controller logic, switch activation, or receipt of instructions. The RF location beacon also may utilizes one or more wireless personal area network (WPAN), wireless local area network (WLAN) or wireless wide area network (WWAN) radio frequency communication standards at the physical layer.

The disclosed method steps also may include the step of providing a base-station transceiver unit coupled to the home network that can receive transmissions from said one or more beacon. The disclosed method steps also may include the step of providing a second computer server on a foreign network, where the second computer server may be coupled to the radio frequency receiving device, the radio frequency receiving device may be coupled to a second gateway server for communication outside the foreign network and the radio frequency receiving device receives radio transmitted signals from beacon, each of the one or more beacon being associated with one or more field asset and the radio frequency receiving device uses radio transmitted signals transmitting tracking, location and status information signals that are communicated to the first computer server on the home network.

DETAILED DESCRIPTION

Figure 1:
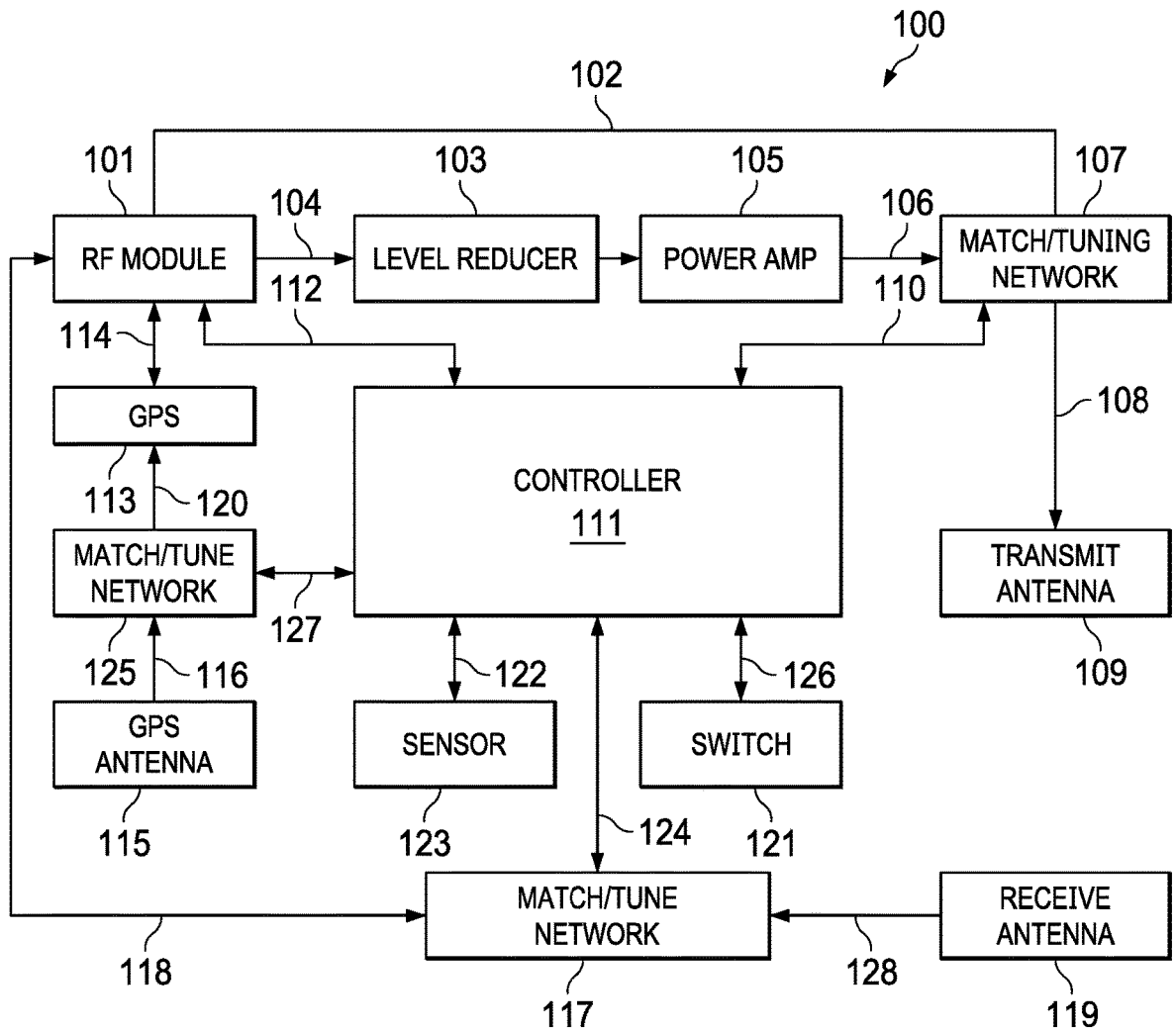
FIG. 1 shows an Integrated Radio Frequency Receiver/Transmitter having Separate Antennas.

The present invention is a cloud integrated, radio frequency (RF) beacon that has the capability to transmit location, presence, and proximity information together with other optional data. The transmit and receive antennas are separately tunable for sensitivity and efficiency. Location information transmitted includes latitude, longitude, and altitude. Presence information transmitted includes date and time, a unique beacon ID, and possible flags indicating movement. Proximity information transmitted includes other beacons that are within range.

The device consists of a single printed circuit board with most or all modules mounted on the board. The antennas may be mounted on board or may be separate from the board. The device is battery powered, using various low input voltages, depending on the specific modules chosen.

The printed circuit board is mounted in a non-metallic case when the antennas are internal to the case. It can be optionally be mounted in a metal case with external antennas. When a battery is attached to the printed circuit board, the printed circuit board is shielded from the battery by a metal shield.

The device contains modules and major sub-components in various configurations specific to the case use of the device. The RF location beacon has one or more of the following components: a Controller Module; RF Transmitter/Receiver Modules, which may be separate or integrated; one or more RF Matching/Tuning Module; Antennas for Transmit, Receive, Location, and may be separate or integrated; one or more Power Amplification Modules; one or more Level Reducer Modules; optionally one or more GPS Module, and optionally one or more Switches that may be Lights, Sound Generators, Power, or other switch operable functions.

The radio frequency location and/or proximity beacon of the present invention has one or more radio frequency module that transmits and receives information via radio frequency signals. The radio frequency module has a transmission portion that transmits presence information including date, time and a unique beacon ID, location and/or proximity data, location data including latitude, longitude and altitude, and proximity data being detection of other beacons in range, and has a receive portion that receives programming instructions and/or detection of other devices in proximity to the beacon, wherein programming instructions are received from an integrated device and/or cloud environment. The programming instructions can be new programming, updates to existing programming, or initiation of prior programed tasks. The RF location beacon has a central controller that holds beacon programming, directs beacon transmit/receive operations, integrates beacon components, and sets power level, data rate and transmit/receive duration.

The RF location beacon also has one or more tunable antennas that can be tuned for efficiency and sensitivity for transmitting and receiving signals. The one or more tunable antennas can be two or more separate antennas, with at least one transmit antenna and at least one receive antenna, or can be a unified transmit/receive antenna. There are one or more matching-tuning networks, where the matching-tuning network is situated between the RF module and each tunable antenna, and tunes power, efficiency and sensitivity of the antenna using controller input. The tunable power levels, allow for tuning the power level to adjust transmit or receive range for the beacon. The RF beacon also has one or more sensors that transmit and receive data using radio transmission.

The radio frequency module transmission of the RF location beacon utilizes one or more wireless personal area network (WPAN), wireless local area network (WLAN) or wireless wide area network (WWAN) radio frequency communication standards at the physical layer. The radio frequency the radio frequency module transmission can utilize standards-based radio frequency communication and non-standards based radio frequency communication. Standards-based radio frequency communication can be one or more of Bluetooth, LoRa, Wireless USB, WiFi, UWB, and ZigBee.

The radio frequency location and/or proximity beacon may include a GPS module, a GPS antenna and a GPS matching tuning network. The radio frequency location and/or proximity beacon may also have one or more power amp for power amplification or de-amplification capabilities, where the power amp is controlled by programed controller logic, switch activation, or receipt of instructions. The radio frequency location and/or proximity beacon may have one or more switch for power, light, sound, signaling and combinations thereof, where the one or more switch is capable of being controlled by said central controller. The data transmitted and received by the beacon may be encrypted. Data transmitted by the beacon is received by one or more radio frequency receiving device that may include a computer, tablet computer, pad computer, laptop computer, mobile phone, handheld mobile device, or a dedicated radio frequency receiving device.

The present invention is a communication system supporting processing of communications regarding a radio frequency (RF) beacon for tracking location and/or proximity of field assets having a first computer server on a home network, said first computer server having one or more hardware data processors with functionality to receive and process tracking, location and proximity information signals relating to field assets. The first computer server is coupled to a first database for storing and maintaining information relating to the field assets and the first computer server is coupled to a home agent and a first gateway server for communication outside the home network. The communication system has one or more radio frequency location and/or proximity beacon associated one or more stationary or moveable field asset. The radio frequency location beacon has one or more radio frequency module that transmits and receives information via radio frequency signals.

The radio frequency module has a transmission portion that transmits presence information including date, time and a unique beacon ID, location and/or proximity data. The location data includes latitude, longitude and altitude, and the proximity data includes detection of other beacons in range. The radio frequency module has a receive portion that receives programming instructions and/or detection of other devices in proximity to the beacon. The programming instructions are received from an integrated device and/or cloud environment. The programming instructions can include new programing, updates to existing programming, or initiation of prior programed tasks. The RF location beacon also has a central controller that holds beacon programming, directs beacon transmit/receive operations, integrates beacon components, and sets power level, data rate and transmit/receive duration.

The RF location beacon further has one or more tunable antennas that can be tuned for efficiency and sensitivity for transmitting and receiving signals. The one or more tunable antennas can be two or more separate antennas, with at least one transmit antenna and at least one receive antenna, or can be a unified transmit/receive antenna. There is one or more matching-tuning network situated between the RF module and each tunable antenna, that tunes power, efficiency and sensitivity of the antenna using controller input; and tunable power levels, where tuning the power level will adjust the beacon transmit or receive range for the beacon. The RF location beacon also has one or more sensors that transmit and receive data using radio transmission.

The communication system also has one or more radio frequency receiving device having application programing to receive radio frequency signals from the radio frequency location and/or proximity beacon. The radio frequency receiving device receives presence, location and proximity signals transmitted from said radio frequency location and/or proximity beacon, and the radio frequency receiving device relays presence, location and proximity data received from the radio frequency location and/or proximity beacon to the first computer server. The radio frequency receiving device can be one or more of a computer, tablet computer, pad computer, laptop computer, mobile phone, handheld mobile device, or a dedicated radio frequency receiving device.

The communication system of the present invention further may include a base-station transceiver unit coupled to the home network that can receive transmissions from one or more beacons. The communication system further may include a second computer server on a foreign network. The second computer server may be coupled to the radio frequency receiving device, and the radio frequency receiving device may be coupled to a second gateway server for communication outside the foreign network. The radio frequency receiving device receives radio transmitted signals from one or more beacon, each of beacon being associated with a field asset and the radio frequency receiving device using the radio transmitted signals transmits tracking, location and status information signals that are communicated to the first computer server on the home network.

The RF beacon in the communication system optionally includes a GPS module, a GPS antenna and a GPS matching tuning network. The RF beacon in the communication system optionally includes one or more power amp for power amplification or de-amplification capabilities that can be controlled by programed controller logic, switch activation, or receipt of instructions. The RF beacon in the communication system optionally includes one or more switch for power, light, sound, signaling and combinations thereof, said one or more switch capable of being controlled by the central controller. RF beacon in the communication system utilizes one or more wireless personal area network (WPAN), wireless local area network (WLAN) or wireless wide area network (WWAN) radio frequency communication standards at the physical layer. The radio frequency module transmission optionally utilizes standards based radio frequency communication, including one or more of Bluetooth, LoRa, Wireless USB, WiFi, UWB, and ZigBee.

The present invention is a method of transmitting communications regarding a radio frequency beacon for tracking location and/or proximity of field assets, having the steps of: (1) providing a first computer server on a home network. The first computer server is coupled to a first database and a first gateway, and the first computer server has one or more hardware data processors; (2) supporting communications to and from the home network using the first gateway server; (3) providing one or more radio frequency location and/or proximity beacon associated with one or more stationary or moveable field asset, (4) providing a radio frequency receiver device that has application programming to receive transmissions from the beacon, said radio frequency receiving device is a computer, tablet computer, pad computer, laptop computer, mobile phone, handheld mobile device, or a dedicated radio frequency receiving device; (5) receiving, by said radio frequency receiver device, radio frequency transmitted signals from the beacon, (6) relaying beacon transmissions received by the radio frequency receiver device to the first computer server, and (7) storing received transmissions in said database.

The beacon used in the method has one or more radio frequency module that transmits and receives information via radio frequency signals. The radio frequency module has a transmission portion that transmits presence information that may include date, time and a unique beacon ID, location and/or proximity data, the location data includes latitude, longitude and altitude, and the proximity data includes detection of other beacons in range. The radio frequency module also has a receive portion that receives programming instructions and/or detection of other devices in proximity to the beacon, where programming instructions are received from an integrated device and/or cloud environment. The programming instructions may be new programing, updates to existing programming, or initiation of prior programed tasks. The RF location beacon has a central controller that holds beacon programming, directs beacon transmit/receive operations, integrates beacon components, and sets power level, data rate and transmit/receive duration. The RF location beacon has one or more tunable antennas that can be tuned for efficiency and sensitivity for transmitting and receiving signals. The one or more tunable antennas can be two or more separate antennas, with at least one transmit antenna and at least one receive antenna, or a unified transmit/receive antenna. There is one or more matching-tuning network situated between the RF module and each tunable antenna, that tunes power, efficiency and sensitivity of the antenna using controller input, and has tunable power levels, where tuning the power level will adjust the beacon transmit or receive range for the beacon; and one or more sensors capable of transmitting and receiving data using radio transmission.

The RF location beacon optionally has a GPS module, a GPS antenna and a GPS matching tuning network. The RF location beacon also optionally has one or more power amp for power amplification or de-amplification capabilities, where the power amp is controlled by programed controller logic, switch activation, or receipt of instructions. The RF location beacon also may utilizes one or more wireless personal area network (WPAN), wireless local area network (WLAN) or wireless wide area network (WWAN) radio frequency communication standards at the physical layer.

The disclosed method steps also may include the step of providing a base-station transceiver unit coupled to the home network that can receive transmissions from said one or more beacon. The disclosed method steps also may include the step of providing a second computer server on a foreign network, where the second computer server may be coupled to the radio frequency receiving device, the radio frequency receiving device may be coupled to a second gateway server for communication outside the foreign network and the radio frequency receiving device receives radio transmitted signals from beacon, each of the one or more beacon being associated with one or more field asset and the radio frequency receiving device uses radio transmitted signals transmitting tracking, location and status information signals that are communicated to the first computer server on the home network.

Figure 2:
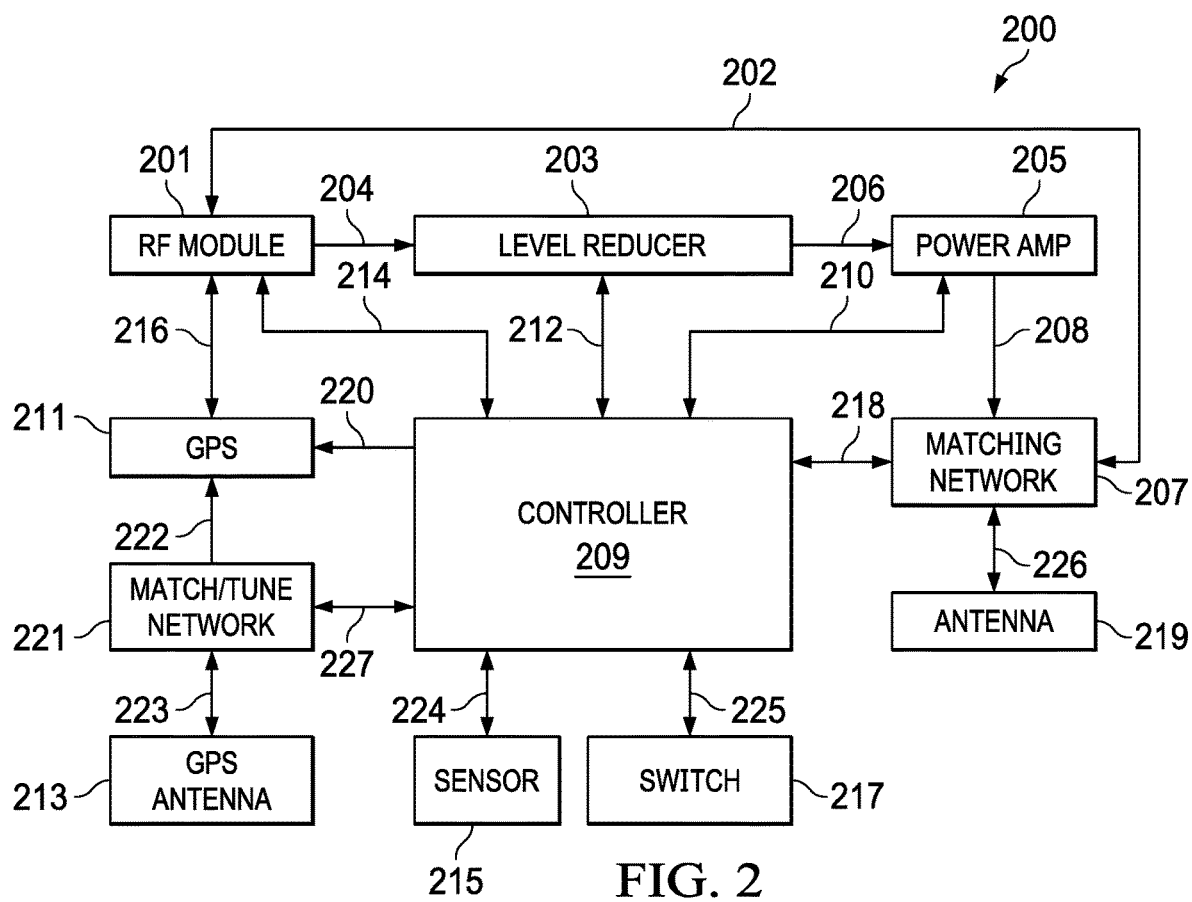
FIG. 2 shows an Integrated Radio Frequency Receiver/Transmitter having a Unified Antenna.
Figure 3:
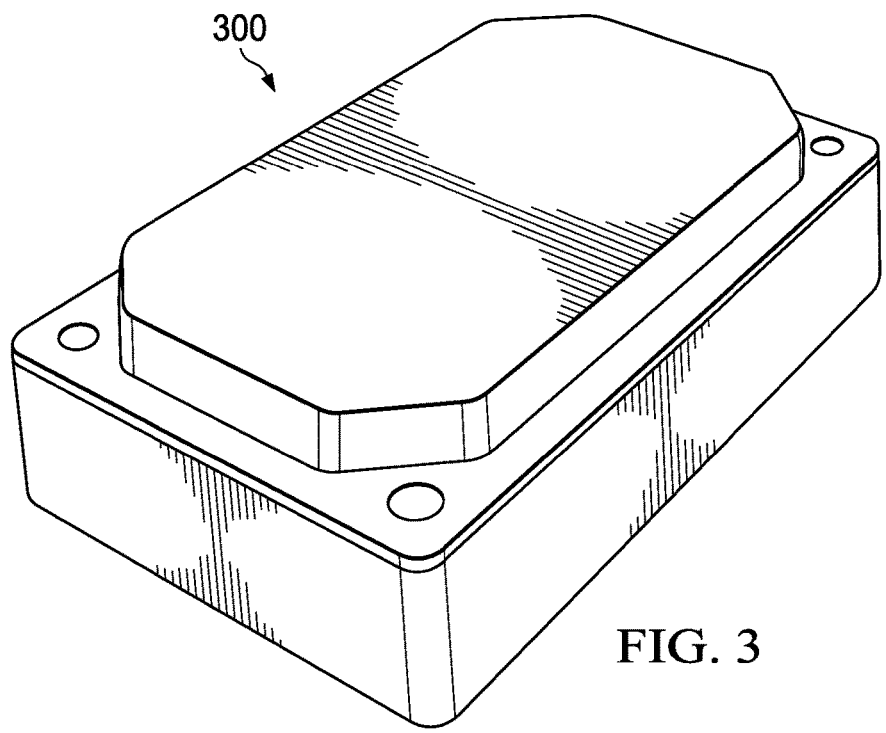
FIG. 3 shows an example of an Integrated Radio Frequency Receiver/Transmitter.

As shown in FIGS. 1 and 2, the beacon, alternately referred to as the device, consists of a set of components and modules integrated into a single device with a power source, communications modules, location modules, control modules with memory, and antennas. Optional connectors and sensors may also be included with the beacon. FIG. 1 shows a framework 100 of the components of the integrated radio frequency location and/or proximity beacon having a separate receive and transmit antennas and FIG. 2 shows a framework 200 of the components of the integrated radio frequency location and/or proximity beacon having a unified transmit/receive antenna. FIG. 3 is a rendering of the beacon's appearance.

FIG. 1 shows a framework 100 of the components of the integrated radio frequency location and/or proximity beacon having a separate receive and transmit antennas and includes the following: (1) a radio frequency module 101; (2) a transmit antenna 109; (3) a match/tuning network 107 between the RF module 101 and transmit antenna 109; (4) a receive antenna 119; (5) a match/tuning network 117 between the RF module 101 and receive antenna 119; and (6) a central controller 111; Optionally, the beacon may include: (7) level reducer 103; (8) Power amp 105; (9) a GPS 113; (10) a GPS antenna 115; (11) a match/tuning network between the GPS and the GPS antenna 125; (12) one or more sensor 123; and (13) one or more switches 121 that can be a light, or a switch, or sound, or any combination of those items.

The controller is typically a CPU with memory and interface channels such as General-Purpose Input/Output (GPIO) ports. The controller 111 is central to the beacon or device, and directs all operations, connecting to all sub-components. This central controller connection can be direct to other components or indirect by passing through other components. The purpose of the central controller is to hold the central programming of the device and direct operations and connections to a cloud environment and/or other devices. In some situations, the controller may be embedded with one or more of the other components of the system. Individual components may only take instructions from the central controller or they may optionally have their own embedded controllers that communicate with the central controller.

The controller 111, as seen in FIG. 1, integrates all components together, and using outgoing transmission to and optional incoming reception from a cloud environment, makes the device part of an integrated system of proximity detection, location determination, optional data, and messaging. This integrated system thus consists of one or more device and its components, the programming on the device and the cloud environment with its programming and systems.

The device contains an RF Module 101 or Modules and transmits and receives information via radio frequency (RF) signals. The radio frequency (RF) transmission module can employ one of many types of personal, local, or wide area radio frequency communications standards at the physical layer. Examples of radio frequency communications standards useful for the invention include, but is not limited to, Bluetooth, LoRa, Wireless USB, WiFi, ultra wide band (UWB), and ZigBee, as well as other compatible systems. System connectivity may be accomplished via various types of networks including, but not limited to, Wireless Personal Area Networks (WPAN), Wireless Local Area Networks (WLAN) and Wireless Wide Area Networks (WWAN). The RF communication may also be accomplished by using a non-standards-based methodology. This non-standards-based communication may be in various parts of the spectrum such as the Industrial, Medical and Scientific bands or various licensed bands as needed. This flexibility of communication standards and communication frequencies allows for diverse use cases. The RF transmit and receive module may be integrated or separate, and may use the same or different frequencies.

The RF transmission portion of the device sends presence identification information or data to uniquely identify the device. This typically, but not always, includes a date and time of transmission. The transmission portion can optionally send location information and/or other data from associated components, such as attached sensors 123. The unique identifier information allows the device to be physically attached to and/or virtually associated with physical assets to identify the presence, proximity, and/or location of the asset. Assets may include inventory, equipment, or personnel. Virtual association with an asset is achieved in the cloud environment, with the programming of the device, or with both. The device can be programmed to transmit at specified intervals, or to transmit based on events or triggers. This allows for controlled updates of the location or proximity of the device, and thus, any assets associated with that device. Transmissions of the data then goes to a cloud environment or to other devices. Portions of the transmitted and/or received data may optionally be encrypted when such encryption is compatible with the transmission and/or reception standards or transmission/reception methods being utilized.

The RF receive portion of the device optionally allows the device to receive new programming or to initiate tasks already programmed into the device. This new programming comes from the cloud environment integrated with device, or optionally, from other devices. The RF receive portion of the device optionally also allows for detection of other devices within range. This information on detection of other devices may optionally be sent with other data that the device normally sends.

High gain and efficiency transmit 109 and receive 119 antennas seen in FIG. 1 are connected to the RF module 101 through tunable matching networks 107, 117, controlled by the central controller 111. The transmit antenna 109 and RF module 101 are connected 108, 102 via the transmit tunable matching network 107. The transmit tunable matching network 107 is also connected 110 to the controller 111. The receive antenna 119 and RF module 101 are connected 128, 118 via the receive tunable matching network 117. The receive tunable matching network 117 is also connected 124 to the controller 111. Receive and transmit operations are controlled separately such that the antenna or antennas can be tuned differently for power, sensitivity, and efficiency in transmit and receive operations. This allows, for example, the receive range to be limited to a small area but the transmit range to be much longer. The unit may detect a signal is close for the purpose of proximity detection and then transmit detection of that signal over a long range for alerting. The unit may be setup to be sensitive for receiving, but transmit over a short range to limit interference, such as, eavesdropping. The combination of transmit and receive sensitivity can then be changed by the beacon controller's programming.

For transmission, the beacon controller 111 directs the transmission to commence and sets the power, data rate, and duration. A high gain, efficient transmit antenna 109 is connected to the RF module 101 with a matching circuit to allow for maximum transmission range. Optionally, controllable power amplification 105 and discrete level reduction 103 can be included in the circuit 104, 106. In addition to the power level, the transmission matching network 107 can be used to control transmission range by tuning or detuning the antenna efficiency, thereby changing the effective power output. This allows control of range. The unit can now use power amplification to cover long range and tuning to fine control range.

For receiving RF communications, the beacon controller 111 directs the receiving to commence. Like transmission, a receive matching network 117 controls receive antenna 119 sensitivity and thus the effective incoming signal power that can be detected. The receiving signal power can also be used by the controller 111 to set the transmission power in various use cases. For example, if a strong signal is received, then signals can be transmitted with lower power.

When operating on battery power, the beacon power usage can be optimized to extend battery life. The beacon controller 111 is able to shut down, or turn on, specific components as needed for power optimization and conservation of the battery life. The beacon controller 111 may also have an internal or external clock circuit that triggers operations at specific intervals. The controller itself can enter a low power mode, then respond to a clock circuit to signal the start of operation.

Power conservation is further achieved by limiting the time the device receives RF signals from the outside. The beacon can transmit its information and then scan for incoming RF signals at a specified time defined in the programming. The incoming scan time can be disabled to achieve lower power usage and effectively isolate the device for security. Low power usage is further achieved by eliminating the need to process incoming signals that are, effectively not received when the receive antenna is detuned.

For positioning information such as GPS, a RF GPS antenna 115 that receives incoming RF signals with position information connected to the RF module 101 can be part of the device. This GPS antenna 115 is a connected 116 through a matching circuit 125 to the GPS module 113 so its sensitivity can be set. The GPS module 113 is connected 114 to the RF module 101. This allows for control of how strong a received signal must be to reach the GPS module 113. Like the receiving unit, this allows for lower power usage by rejecting weak or unneeded signals and not engaging the GPS module 113 to process them. This also allows the positioning to be sensitized or de-sensitized based on programming. For example, the unit may be set to only look for strong positioning signals after a triggering event. Triggering events might be broadcasting a certain number of times after powering on, not receiving incoming signals after a certain number of listening events, or other events specified by the programming.

Sensors 123, either internal or external, may be connected 122 directly to the Beacon by way of the controller 111, and may include external sensors that transmit to and receive from the Beacon using radio transmissions. The transmission portion can optionally send location information and/or other data from associated components, such as the sensors 123. Optionally, sensors can track sensory data, such as temperature, moisture and light, as well as additional location and proximity data. Optionally, lights and/or sound and/or power can be triggered by received instructions via messages or by conditions can be programmed into the controller logic or by one or more switch 121 connected 126 to the controller 111. Switch 121 can be a light, or a switch, or sound or any combination of those items. Lights can be used to indicate transmit and receive ranges and well as power remaining if operating on battery power, and/or one or more switch may be included to allow for multiple end user interactions with the unit, including power on/off and indication for power level remaining.

FIG. 2 shows a framework 200 of the components of the integrated radio frequency location and/or proximity beacon having a unified transmit/receive antenna and includes the following: (1) a radio frequency module 201; (2) a transmit/receive antenna 219; (3) a match/tuning network between the RF module and transmit/receive antenna 207; and (4) a central controller 209; Optionally, the beacon also includes:

(5) level reducer 203; (6) Power amp 205; (7) a GPS 211; (8) a GPS antenna 213; (9) a match/tuning network between the GPS and the GPS antenna 212; (10) one or more sensor 215; and (11) one of more switch 217 that can be a light, or a switch, or sound or any combination of those items.

The controller 209 is central to the beacon or device, and directs all operations, connecting to all sub-components. This central controller connection can be direct to other components or indirect by passing through other components. The purpose of the central controller 209 is to hold the central programming of the device and direct operations and connections to a cloud environment and/or other devices. In some situations, the controller may be embedded with one or more of the other components of the system. Individual components may only take instructions from the central controller or they may optionally have their own embedded controllers that communicate with the central controller.

The controller 209. As shown in FIG. 2, integrates all components together, and using outgoing transmission to and optional incoming reception from a cloud environment, makes the device part of an integrated system of proximity detection, location determination, optional data, and messaging. This integrated system thus consists of one or more device and its components, the programming on the device and the cloud environment with its programming and systems.

The device contains an RF Module 101 or Modules and transmits and receives information via radio frequency (RF) signals. The radio frequency (RF) transmission module can employ one of many types of personal, local, or wide area radio frequency communications standards at the physical layer. Examples of radio frequency communications standards useful for the invention include, but is not limited to, Bluetooth, LoRa, Wireless USB, WiFi, ultra wide band (UWB), and ZigBee, as well as other compatible systems. System connectivity may be accomplished via various types of networks including, but not limited to, Wireless Personal Area Networks (WPAN), Wireless Local Area Networks (WLAN) and Wireless Wide Area Networks (WWAN). The RF communication may also be accomplished by using a non-standards-based methodology. This non-standards-based communication may be in various parts of the spectrum such as the Industrial, Medical and Scientific bands or various licensed bands as needed. This flexibility of communication standards and communication frequencies allows for diverse use cases. The RF transmit and receive module may be integrated or separate, and may use the same or different frequencies The RF transmission portion of the device sends presence identification information or data to uniquely identify the device. This typically, but not always, includes a date and time of transmission. The transmission portion can optionally send location information and/or other data from associated components, such as attached sensors 215. The unique identifier information allows the device to be physically attached to and/or virtually associated with physical assets to identify the presence, proximity, and/or location of the asset. Virtual association with an asset is achieved in the cloud environment, with the programming of the device, or with both. The device can be programmed to transmit at specified intervals, or to transmit based on events or triggers. This allows for controlled updates of the location or proximity of the device, and thus, any assets associated with that device. Transmissions of the data then goes to a cloud environment or to other devices. Portions of the transmitted and/or received data may optionally be encrypted when such encryption is compatible with the transmission and/or reception standards or transmission/reception methods being utilized.

The RF receive portion of the device optionally allows the device to receive new programming or to initiate tasks already programmed into the device. This new programming comes from the cloud environment integrated with device, or optionally, from other devices. The RF receive portion of the device optionally also allows for detection of other devices within range. This information on detection of other devices may optionally be sent with other data that the device normally sends.

A high gain and efficiency transmit and receive unified antenna 219, shown in FIG. 2, is connected to the RF module 201 through a tunable matching networks 207 controlled by the central controller 209. The unified antenna 219 and RF module 201 are connected 208, 226 via the tunable matching network 207. The tunable matching network 207 is also connected 218 to the controller 209. Receive and transmit operations are controlled in the unified antenna 219, such that the unified antenna 219 can be tuned differently for power, sensitivity, and efficiency in transmit and receive operations. This allows, for example, the receive range to be limited to a small area but the transmit range to be much longer. The unit may detect a signal is close for the purpose of proximity detection and then transmit detection of that signal over a long range for alerting. The unit may be setup to be sensitive for receiving, but transmit over a short range to limit interference, such as, eavesdropping. The combination of transmit and receive sensitivity can then be changed by the beacon controller's programming.

For transmission, the beacon controller 209 directs the transmission to commence and sets the power, data rate, and duration. A high gain, efficient unified antenna 219 is connected to the RF module 201 with a matching circuit to allow for maximum transmission range. Optionally, controllable power amplification 205 and discrete level reduction 203 can be included in the circuit 204, 206. In addition to the power level, the transmission matching network 207 can be used to control transmission range by tuning or detuning the antenna efficiency, thereby changing the effective power output. This allows control of range. The unit can now use power amplification to cover long range and tuning to fine control range.

For receiving RF communications, the beacon controller 209 directs the receiving to commence. Like transmission, the matching network 207 controls the unified antenna 219 sensitivity and thus the effective incoming signal power than can be detected. The receiving signal power can also be used by the controller 209 to set the transmission power in various use cases. For example, if a strong signal is received, then signals can be transmitted with lower power.

When operating on battery power, the beacon power usage can be optimized to extend battery life. The beacon controller 209 is able to shut down, or turn on, specific components as needed for power optimization and conservation of the battery life. The beacon controller 209 may also have an internal or external clock circuit that triggers operations at specific intervals. The controller itself can enter a low power mode, then respond to a clock circuit to signal the start of operation.

Power conservation is further achieved by limiting the time the device receives RF signals from the outside. The beacon can transmit its information and then scan for incoming RF signals at a specified time defined in the programming. The incoming scan time can be disabled to achieve lower power usage and effectively isolate the device for security. Low power usage is further achieved by eliminating the need to process incoming signals that are, effectively not received when the receive antenna is detuned.

For positioning information such as GPS, a RF GPS antenna 213 that receives incoming RF signals with position information connected to the RF module 201 can be part of the device. This GPS antenna 213 is a connected 223 through a matching circuit 221 to the GPS module 211 so its sensitivity can be set. The GPS module 211 is connected 216 to the RF module 201. This allows for control of how strong a received signal must be to reach the GPS module 211. Like the receiving unit, this allows for lower power usage by rejecting weak or unneeded signals and not engaging the GPS module 211 to process them. This also allows the positioning to be sensitized or de-sensitized based on programming. For example, the unit may be set to only look for strong positioning signals after a triggering event. Triggering events might be broadcasting a certain number of times after powering on, not receiving incoming signals after a certain number of listening events, or other events specified by the programming.

Sensors 215, either internal or external, may be connected 224 directly to the Beacon by way of the controller 209, and may include external sensors that transmit to and receive from the Beacon using radio transmissions. The transmission portion can optionally send location information and/or other data from associated components, such as the sensors 215. Optionally, sensors can track sensory data, such as temperature, moisture and light, as well as additional location and proximity data. Optionally, lights and/or sound and/or power can be triggered by received instructions via messages or by conditions that can be programmed into the controller logic or by one or more switch 217 connected 225 to the controller 209. Switch 217 can be a light, or a switch, or sound or any combination of those items. Lights can be used to indicate transmit and receive ranges and well as power remaining if on battery power, and/or one or more switch may be included to allow for multiple end user interactions with the unit, including power on/off and indication for power level remaining.

In the RF location beacons shown in FIGS. 1 and 2, RF transmission power level is controlled by a level reducer module, a power amplification module, a tuning/matching module, and the transmission antenna. The controller can direct the level reducer module to reduce the power level going into the power amplification module. The power amplified can be set to boost the signal to the transmission antenna. The tuning/matching module can be set to change effective transmitted power. The RF receive power level of the device is controlled by a tuning/matching module and the receive antenna.

An optional GPS module can be included to determine positioning information. The GPS module may have its own antenna and it may optionally have a turning/matching module that can be controlled by the controller. Sensors such a temperature may be optionally included on the board or as external units that interface physically to the board.

A switch may be included to turn the device on or off. A switch may be included to signal the controller to take some action. One or more lights may be included and engaged by the controller. As an example, lights may be used to indicate information to a human user. A sound generator may be included and engaged by the controller.

The Controller holds the core programming of the device and directs operations and connections to a cloud environment and/or other devices. The controller integrates all components together and, using outgoing transmission to and optional incoming reception from a cloud environment, makes the device part of an integrated system of proximity detection, location determination, optional data, and messaging. This integrated system thus consists of the device (one or more) and its components, the programming on the device and the cloud environment with its programming and systems.

High gain and efficiency antennas are connected to the RF modules through tunable matching networks, controlled by the central controller. Receive and transmit operations are controlled separately such that the antenna or antennas can be tuned differently for power, sensitivity, and efficiency in transmit and receive. This allows, for example, the receive range to be limited to a small area but the transmit range to be much longer. The unit may detect a signal is close for the purpose of proximity detection and then transmit that it has detected that signal over a long range for alerting. The unit may be setup to be sensitive for receiving but transmit over a short range to limit, for example, eavesdropping. The combination of transmit and receive sensitivity can then be changed by the controllers programming.

For transmission, the controller directs the transmission to commence and sets the level reduction, power, data rate and duration. A high gain, efficient antenna is connected to the RF module with a matching circuit to allow for maximum transmission range at the selected settings. The transmission matching network is then used, in addition to power level, to control transmission range by turning or detuning the antenna efficiency and thus changing the effective power output. This allows control of range in the receiving situation. The unit can now use power amplification to cover long range and tuning to fine control range.

For receiving of RF communications, the controller directs the receiving to commence. Like transmission, a receive matching network controls antenna sensitivity and thus the effective incoming signal power than can be detected. The receiving signal power can also be used by the controller to then set the transmission power in various use cases. For example, if a strong signal is received, then transmit with lower power.

It is key that the beacon optimize power usage to achieve long battery life when running on battery power. The controller will shut down specific components or turn them on as needed for power optimization and long battery life when connected to battery power. The controller may additionally have an internal or external clock circuit that triggers operations at specific intervals. The controller itself can shut down to a low power mode, waiting for the clock to signal the start of operation.

Low power usage is further achieved by limiting the time the device will receive RF signals from the outside. The beacon can transmit its information and then scan for incoming RF signals for a time defined in the programming. The incoming scan time can be disabled to achieve lower power usage and effectively isolate the device for security. Low power is further achieved by the elimination of the need to process incoming signals that are, effectively not received when the receive antenna is detuned.

For positioning information such as GPS, an RF antenna that receives incoming RF signals with position information can be part of the device. This antenna is a connected through a matching circuit so its sensitivity can be set. This allows for control of how strong a signal must be received to make it through to the GPS module. Like the receiving unit, this allows for lower power usage by rejecting signals and not engaging the GPS module to process them. This also allows to the positioning to be sensitized or de-sensitized based on programming. For example, the unit may be set to only look for strong positioning signal after a triggering event. Examples of triggering event might be broadcasting a certain number of times after power on, not receiving incoming signal after a certain number of listening events, and similar events.

The device broadcasted data packets are received either by standalone, non-edge devices or by edge devices connected to the cloud (FIGS. 4-9). These receiving devices may be mobile or fixed. The data broadcast by the device can be stored in the cloud for tracking, identification, proximity location and other purposes.

The RF receive portion of the device optionally allows the device to receive new programming or to initiate tasks already programmed into the device. This new programming comes from the cloud environment that the device is integrated with or optionally from other mobile or fixed devices that broadcast to the device.

The RF receive portion of the device optionally also allows for detection of other devices within range. This information on detection of other devices may optionally be sent with other data that the device normally sends.

The present invention specifically provides for a Beacon where the transmit antenna efficiency can be tuned, and where the transmission range is set by any combination of data rate, power and efficiency. The transmission power is set by control logic using one or both of two discrete methods; stepped level reduction/increase, and continuous power amplification/de-amplification.

The beacon has power amplification that may use a single amplifier or multiple amplifiers for high power capability. The beacon allows for an on/off capability for power amplification and/or power amplifiers may be used to de-amplify for power reduction. The beacon contains stepped level reduction/increase that may be single or multiple in series, and allows that power amplification may optionally be set to exceed regulatory limits for military needs. Such power levels may be set by condition specified in the controller logic, by activation of a switch or by receiving instructions to the unit, and the ability to exceed power levels may be disabled either temporarily or permanently such that the permanent disable cannot be modified.

Beacon transmission can be at the low end in the single digits of meters or sub meters and at the high end in the range of tens to hundreds of kilometers.

The Beacon will contain control logic for setting data rate, power amplification/de-amplification, level reduction/increase, antenna efficiency and antenna sensitivity in any combination. The control logic may be a distinct unit, or it may be integrated with RF modules and/or GPS units. The Beacon may contain control logic that allows a receiving antenna to use one or more transmitting antennas and signals for feedback and automatic adjustment of both antennas. The Beacon may contain control logic that allows a transmit antenna to use one or more receiving antennas and signals for feedback and automatic adjustment of both antennas. The Beacon may also contain automatic adjustment of receiving and transmitting antenna parameters by the method of receiving a known working signal with setup information and using this to adjust parameters.

A Beacon that can receive over the air instructions to change any of its settings related to the combination of transmit and receive power, antenna efficiency, antenna sensitivity and data rate is disclosed. The instructions may be requested by the Beacon or they may be pushed to the Beacon on demand or at defined intervals. The ability to allow for requests and/or push instructions can be configured to be allowed or disallowed on the Beacon. The ability to allow or disallow can itself be turned on or off.

Beacons of the present invention may contain only transmit capability where settings cannot be changed over the air, or may have receive only capability. The beacons optionally have position capability via GPS or other positioning methodology. Optionally, light and/or sound triggered by received instructions via messages or by conditions can be programmed into the controller logic or by a switch. Lights can be used to indicate transmit and receive ranges and well as power remaining if on battery power, and/or a switch may be included to allow for multiple end user interactions with the unit, including power on/off and indication for power level remaining.

The beacon may, optionally, contain separate physical or logical antennas that are dedicated to the transmit and receive signals. The beacon may contain antennas that are tunable for range and power using step power reducers, power amplifiers/de-amplifiers and antenna efficiency/sensitivity. External sensors may be connected directly to the Beacon, and may be external sensors that transmit to and receive from the Beacon using radio transmissions.

Messages sent by Beacons and messages to Beacons may optionally be encrypted. Encryption is controllable and changeable at time of use for message creation at the Beacon level. This control is based on encryption setup settings as well as the Beacon settings for data rate, power amplification, level reduction and antenna efficiency. Encryption will, with the Beacon control logic, either use settings to configure itself or optionally adapt itself based on these settings and any external conditions detected by the receiving and transmitting antennas.

In the beacon, antenna sensitivity and efficiency can be set by a matching network for each physical antenna and that matching network integrates with power settings and data rate settings. Advantageously, antenna sensitivity is tunable, allowing for defined ranges of reception.

More specifically, a Radio Frequency transmitter and receiver unit (Beacon) where separate and optionally multiple physical or logical antennas are dedicated to the transmit and receive signals and the different physical or logical antennas are tunable for range and power using step power reducers/increasers, power amplifiers/de-amplifiers, antenna efficiency/sensitivity and data rate.

Beacons can be used a variety of communication configurations. FIGS. 4-7 show block diagrams of a few examples of communication systems that may be used with the beacon, which includes computer servers, RF receiving devices, such as a computer, tablet computer, pad computer, laptop computer, mobile phone, handheld mobile device, or a dedicated radio frequency receiving device, and wireless networks. Other configurations are also envisioned that may be used with the beacons.

Figure 4:
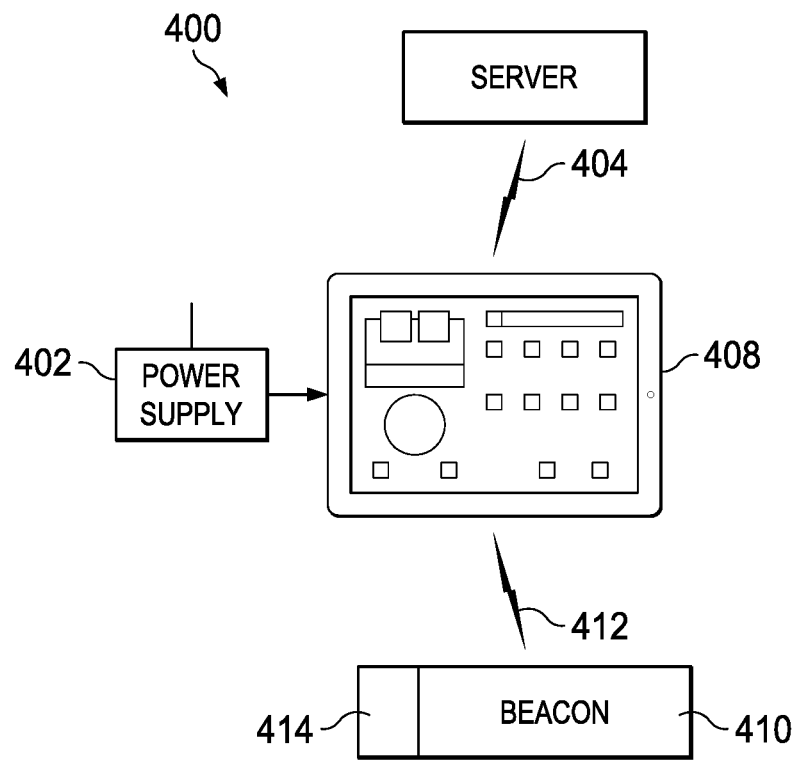
FIGS. 4-7 show component block diagrams for several configurations utilizing the beacon of the present invention.

As shown in FIG. 4, for system configuration 400, the Radio Frequency Location and/or proximity Beacon 410, which is coupled to a tablet/laptop computer/mobile phone 408 via radio frequency wireless communication 412. The Beacon 410 has an integral power supply 414 and the tablet/laptop computer/mobile phone 408 are coupled to power supply 402. The tablet/laptop computer/mobile phone 408 interfaces 404 with the home network computer server 406.

Figure 5:
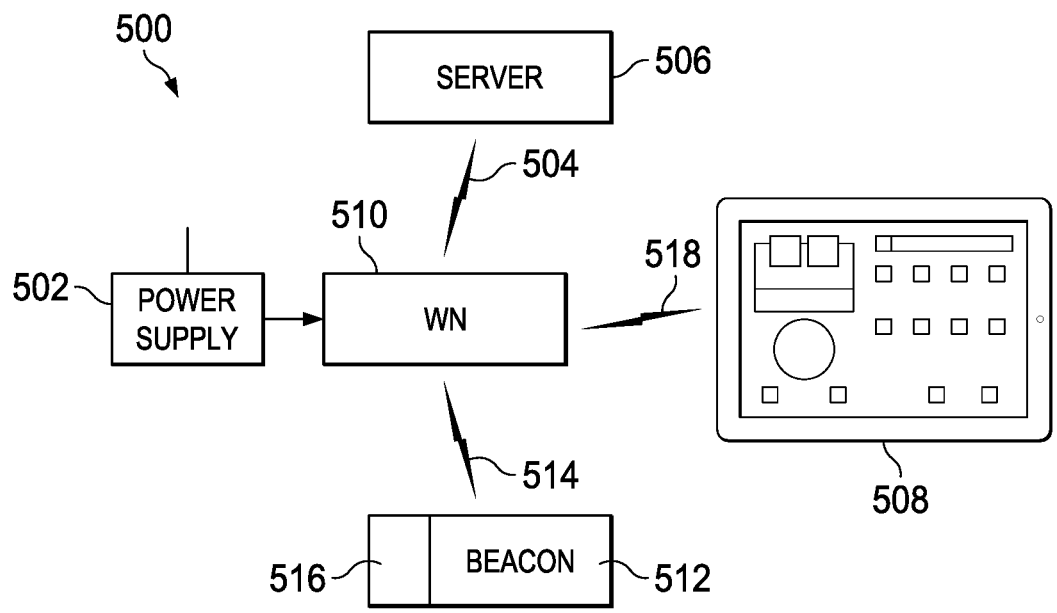

As shown in FIG. 5, for system configuration 500, the Radio Frequency Location and/or proximity Beacon 512 has an internal power supply 516 and is coupled 514 to a wireless network communication hub 510 via radio frequency wireless communication 512. The wireless network communication hub 510 is coupled to a power supply 502 and interfaces 518 with the tablet/laptop computer/mobile phone 508 and also interfaces 504 with the home network computer server 506.

Figure 6:
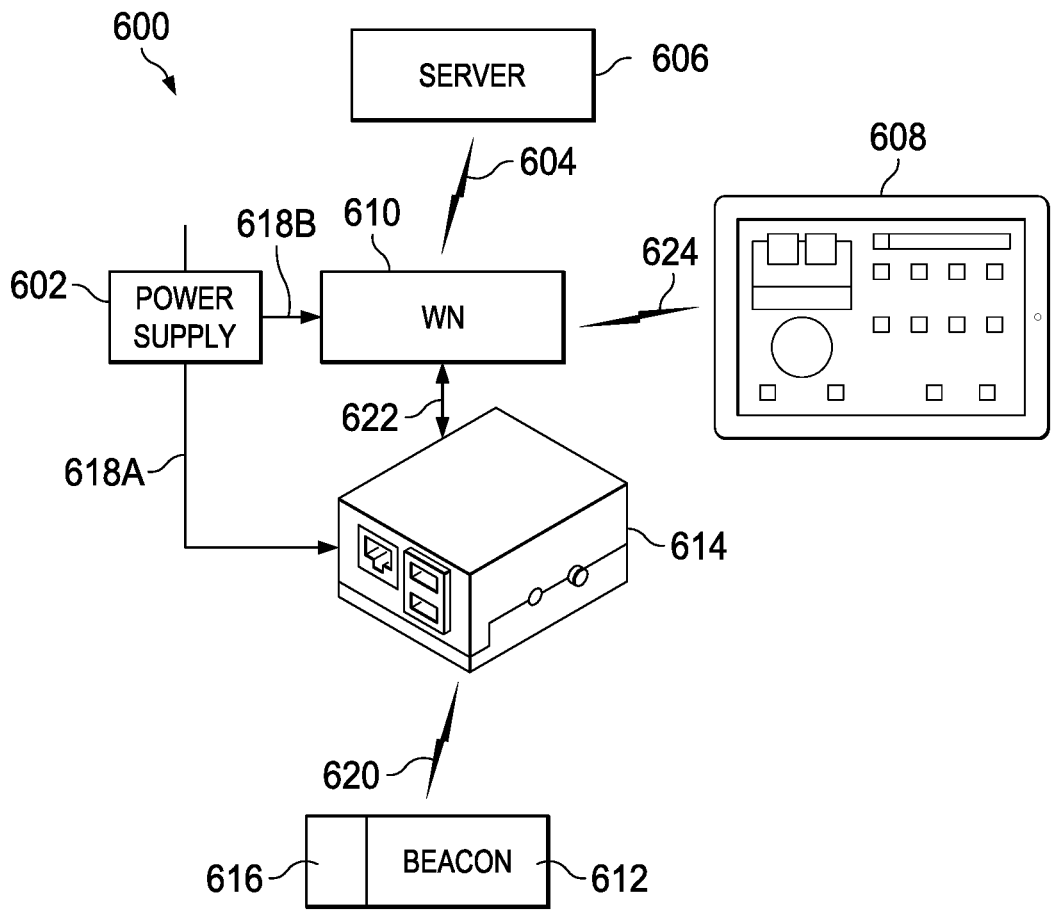

As shown in FIG. 6, for system configuration 600, the Radio Frequency Location and/or proximity Beacon 612 has an internal power supply 616 and is coupled to a first server computer 614 via radio frequency wireless communication 620. The first server computer 614 is separately coupled 622 to a wireless network communication hub 610. The wireless network communication hub 610 and the first computer server 614 are coupled 618A, 618B to power supply 602. The wireless network communication hub 610 is coupled 624 to the tablet/laptop computer/mobile phone 608 and separately coupled 604 to the home network computer server 606.

Figure 7:
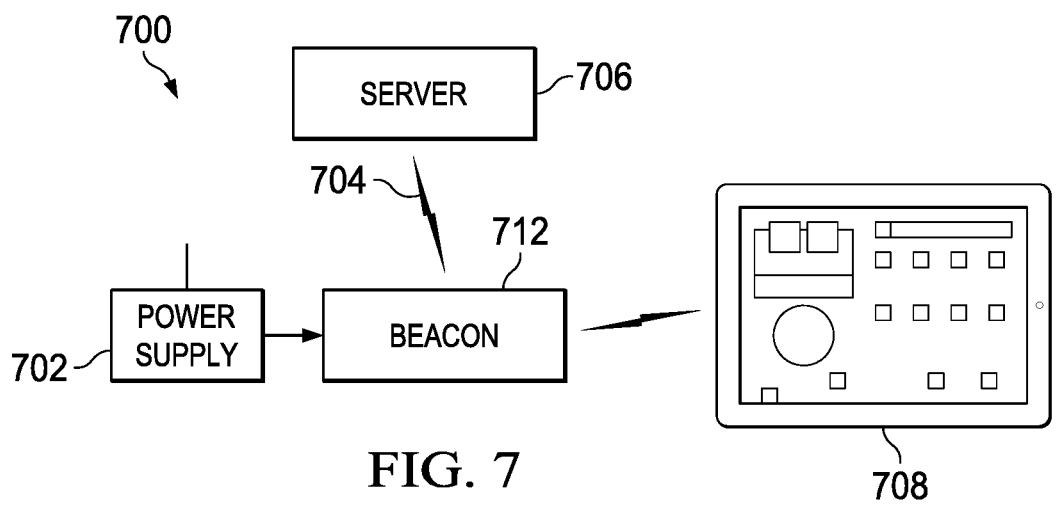

As shown in FIG. 7, for system configuration 700, the Radio Frequency Location and/or proximity Beacon 712 has an internal power supply 701 and is coupled via radio frequency wireless communication 710 to the tablet/laptop computer/mobile phone 708. The tablet/laptop computer/mobile phone 708 separately interfaces 704 with the home network computer server 706.

Figure 8:
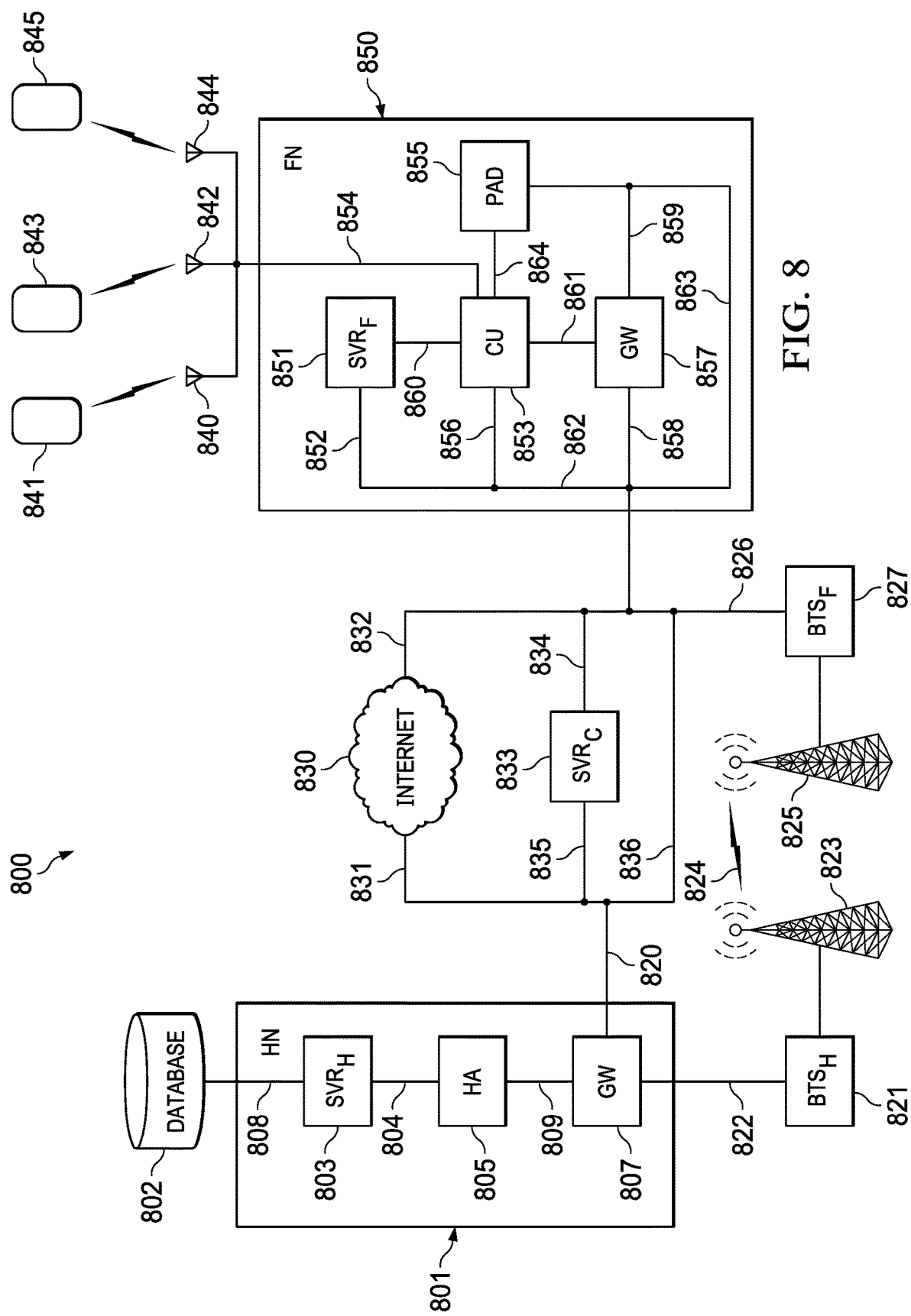
FIG. 8 shows one communications network according to the present invention.

The present invention is shown by the block diagram in FIG. 8, and is a communication system supporting the processing communications between a home network 801 and one or more mobile foreign networks 850, where the home network 801 has a home agent 805 coupled to a home network computer server(h) (SVR(h)) 803 by line 804. The home network computer server(h) 803 is coupled to a database memory 802. While only one database 802 is shown, this representation is understood to include one or more separate databases and storage locations of data and information. A communications link or line is any connection between two or more nodes on a network or users on networks or administrative domains, including serial lines, parallel lines and bus lines for electronic signal transmission.

The database 802 may maintain information related asset management and tracking, and the home network server computer(h) 803 processes instructions and data to operate the enterprise asset management and tracking software for the system. The invention contemplates centrally located computer servers to operate the software modules and database information on the network, but remotely located servers and computer networks can also be accessed and used with the invention.

The home agent 805 on the home network 801 is coupled to a gateway 807 by line 809, and the gateway 807 facilitates communicates to and from the home network 801. The gateway 807 is coupled to a base station transceiver BTS(h) 821 via line 822, which is coupled to a radio transmission unit and antenna 823 via line 829. That radio transmission unit and antenna 823 facilitates communications to other radio transmission units 825. The transmission unit 823 supports radio transmission communications links (e.g. Wi-Fi, cellular, GSM, Evdo, 4G/LTE, CDMA, or others), to other networks and communication units.

The home network gateway 807 is also coupled via line 820 to hardwire communication line 836, communications computer server(c) (SVR(c)) 833 via line 835, and the Internet 830 via line 831. The home network processes communications to and from mobile foreign networks, and information related to the external devices and beacons (e.g. location, proximity, status) can be included in communications to the home network. The home network can communicate via wireless transmission or a wired communication link to the mobile node, the Internet, other computer servers or other foreign or associated home networks.

As also shown in FIG. 8, Radio Frequency Location and/or proximity Beacons 841, 843 and 845 are electronically coupled to Radio Frequency readers 840, 842 and 844, respectively. Radio Frequency readers 840, 842 and 844 are coupled to the controller unit CU 853 via line 854, which is coupled to foreign computer server(f) (SVR(f)) 851 via line 860, tablet/laptop/mobile phone 855 via line 864, and foreign network gateway 857 via line 861.

The controller unit CU 853, computer server(f) 851, pad/laptop/mobile phone 855, and foreign network gateway 857 are coupled to the Internet 830 via lines 830 and 856, lines 830 and 852, lines 8305 and 863, and lines 830 and 858 respectively. The controller unit CU 853, computer server(f) 851, pad/laptop/mobile phone 855, and foreign network gateway 857 are coupled to the computer server(c) 833 via lines 834 and 856, lines 834 and 852, lines 834 and 863, and lines 834 and 858 respectively. The controller unit CU 853, computer server(f) 851, pad/laptop/mobile phone 855, and foreign network gateway 857 are coupled to the home network 801 by a hardwire communication link via lines 820, 836, and 856; lines 820, 836, and 852; lines 820, 836, and 863; and lines 820, 836, and 858, respectively. And, controller unit CU 853, computer server(f) 851, pad/laptop/mobile phone 855, and foreign network gateway 857 are coupled to the base-station transceiver unit(f) (BTS(f)) 827 (coupled to transmission unit and antenna 825) via lines 826 and 856, lines 826 and 852, lines 826 and 863, and lines 826 and 858 respectively.

Figure 9:
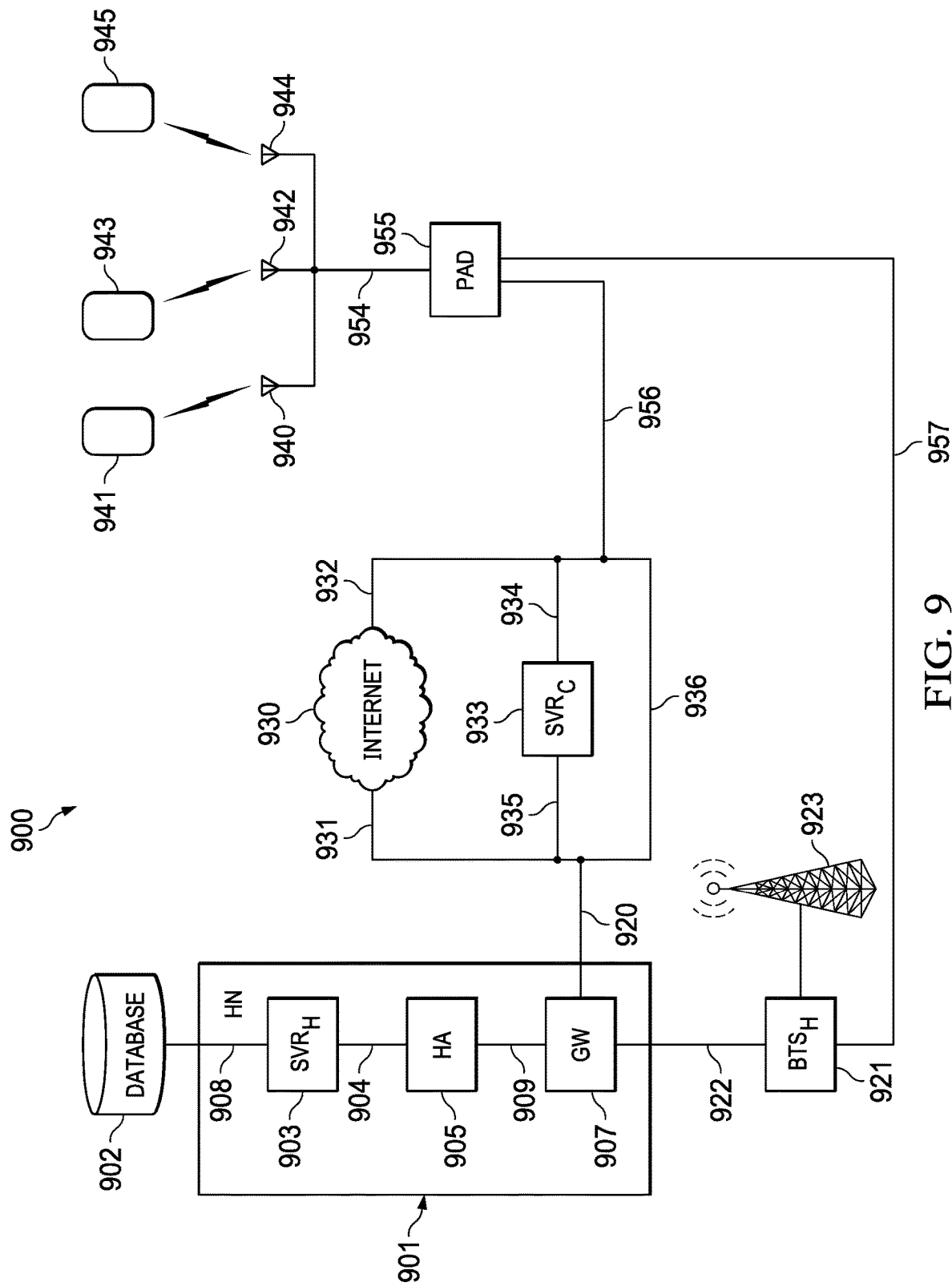
FIG. 9 shows another communications network according to the present invention.

The present invention is also shown by the block diagram in FIG. 9, as a local communication system supporting the processing communications between a home network 901 and one or more radio frequency receiving devices (pad/laptop/mobile phone) 956, where the home network 901 has a home agent 905 coupled to a home network computer server(h) (SVR(h)) 903 by line 904. The home network computer server(h) 903 is coupled to a database memory 902. While only one database 902 is shown, this representation is understood to include one or more separate databases and storage locations of data and information. A communications link or line is any connection between two or more nodes on a network or users on networks or administrative domains, including serial lines, parallel lines and bus lines for electronic signal transmission.

The database 902 may maintain information related asset management and tracking, and the home network server computer(h) 903 processes instructions and data to operate the enterprise asset management and tracking software for the system. The invention contemplates centrally located computer servers to operate the software modules and database information on the network, but remotely located servers and computer networks can also be accessed and used with the invention.

The home agent 905 on the home network 901 is coupled to a gateway 907 by line 909, and the gateway 907 facilitates communicates to and from the home network 901. The gateway 907 is coupled to a base station transceiver BTS(h) 921 via line 922, which is coupled to a radio transmission unit and antenna 923 via line 929. That radio transmission unit and antenna 923 facilitates communications to other radio transmission units 925. The transmission unit 923 supports radio transmission communications links (e.g. Wi-Fi, cellular, GSM, Evdo, 4G/LTE, CDMA, or others), to other networks and communication units.

The home network gateway 907 is also coupled via line 920 to hardwire communication line 936, communications computer server(c) (SVR(c)) 933 via line 935, and the Internet 930 via line 931. The home network processes communications to and from mobile foreign networks, and information related to the external devices and beacons (e.g. location, proximity, status) can be included in communications to the home network. The home network can communicate via wireless transmission or a wired communication link to the mobile node, the Internet, other computer servers or other foreign or associated home networks.

As also shown in FIG. 9, Radio Frequency Location and/or proximity Beacons 941, 943 and 945 are electronically coupled to Radio Frequency readers 940, 942 and 944, respectively. Radio Frequency readers 940, 942 and 944 are part of the pad/laptop/mobile phone 955 via line 954.

The pad/laptop/mobile phone 955 is coupled to the Internet 930 via lines 956. The pad/laptop/mobile phone 955 is coupled to the Internet 930 via lines 956. The RF receiver pad/laptop/mobile phone 955 is coupled to the base-station transceiver unit(h) (BTS(h)) 921 via lines 957.

EXAMPLES

The following examples represent only a few of the possible uses envisioned for the Radio Frequency Location and/or proximity Beacons of the present invention. These examples are not the only uses of the invention nor is the introduction of these examples intended to in any way limit uses of the invention.

Building Room Identification: A Radio Frequency Location and/or proximity Beacon can be placed in each room in a building, for example, each room in a hotel or each room in an office, and each beacon has a unique ID that is associated with that room. The receive sensitivity of each beacon unit is tuned such that signals outside of a room are minimized. The transmit power of the unit is set to reach a base station that may be placed in the management center of a hotel or business. Beacon units can then individually, or in concert, signal the location of a RF Radio Module received signal of interest. This could be used, for example, for personnel wearing a radio frequency transmitter to identify conditions of interest, like safety alerts. The base stations or station would receive alert signal and compatible mobile phones or other devices could also be set to receive the signals.

Campus Location Beacons: Radio Frequency Location and/or proximity Beacons with GPS can be attached to movable assets, such as personnel, equipment or inventory, or stationary assets, such as freezers, in an industrial campus setting. The beacons can be set to transmit location to a receiving station over the entire campus, allowing for campus-wide location tracking of the assets without the use of a cellular network.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

The invention claimed is:

1. A radio frequency location and/or proximity beacon comprising:
one or more radio frequency module that transmits and receives information via radio frequency signals, said radio frequency module having
a transmission portion that transmits presence information including date, time and a unique beacon ID, location and/or proximity data, said location data including latitude, longitude and altitude, and said proximity data being detection of other beacons in range, and
a receive portion that receives programming instructions and/or detection of other devices in proximity to the beacon, wherein programming instructions are received from an integrated device and/or cloud environment, said programming instructions being new programming, updates to existing programming, or initiation of prior programmed tasks;
a central controller, said central controller holds beacon programming, directs beacon transmit/receive operations, integrates beacon components, and sets power level, data rate and transmit/receive duration;
one or more tunable antennas that can be tuned for efficiency and sensitivity for transmitting and receiving signals, said one or more tunable antennas being two or more separate antennas, with at least one transmit antenna and at least one receive antenna, or a unified transmit/receive antenna;
one or more matching-tuning networks, wherein the matching-tuning network is situated between the RF module and each tunable antenna, and tunes power, efficiency and sensitivity of the antenna using controller input; and
tunable power levels, wherein tuning the power level will adjust transmit or receive range for the beacon; and
one or more sensors, said sensors transmitting and receiving data using radio transmission.

2. The radio frequency location and/or proximity beacon of claim 1 wherein the radio frequency module transmission utilizes one or more wireless personal area network (WPAN), wireless local area network (WLAN) or wireless wide area network (WWAN) radio frequency communication standards at the physical layer.

3. The radio frequency location and/or proximity beacon of claim 1 wherein the radio frequency module transmission utilizes standards-based radio frequency communication.

4. The radio frequency location and/or proximity beacon of claim 3 wherein the standards-based radio frequency communication is one or more of Bluetooth, LoRa, Wireless USB, WiFi, UWB, and ZigBee.

5. The radio frequency location and/or proximity beacon of claim 1 wherein the radio frequency module transmission utilizes one or more non-standards based radio frequency communication.

6. The radio frequency location and/or proximity beacon of claim 1 further comprising a GPS module, a GPS antenna and a GPS matching tuning network.

7. The radio frequency location and/or proximity beacon of claim 1 further comprising one or more power amp for power amplification or de-amplification capabilities, said power amp controlled by programed controller logic, switch activation, or receipt of instructions.

8. The radio frequency location and/or proximity beacon of claim 1 further comprising one or more switch for power, light, sound, signaling and combinations thereof, said one or more switch capable of being controlled by said central controller.

9. The radio frequency location and/or proximity beacon of claim 1 wherein data transmitted and received by the beacon is encrypted.

10. The radio frequency location and/or proximity beacon of claim 1 wherein data transmitted by the beacon is received by a radio frequency receiving device, said radio receiving device being a computer, tablet computer, pad computer, laptop computer, mobile phone, handheld mobile device, or a dedicated radio frequency receiving device.

11. A communication system supporting processing of communications regarding a radio frequency (RF) beacon for tracking location and/or proximity of field assets, comprising:
   a first computer server on a home network, said first computer server having one or more hardware data processor with functionality to receive and process tracking, location and proximity information signal relating to field assets, said first computer server coupled to a first database for storing and maintaining information relating to said field assets and said first computer server being coupled to a home agent and a first gateway server for communication outside the home network;
   one or more radio frequency location and/or proximity beacon associated one or more stationary or moveable field asset, said beacon having:
   one or more radio frequency module that transmits and receives information via radio frequency signals, said radio frequency module having a transmission portion that transmits presence information including data, time and a unique beacon ID, location and/or proximity data, said location data including latitude, longitude and altitude, and said proximity data being detection of other beacons in range, and receive portion that receives programming instructions and/or detection of other devices in proximity to the beacon, wherein programming instructions are received from an integrated device and/or cloud environment, said programming instructions being new programming, updates to existing programming, or initiation of prior programmed tasks;
   a central controller that holds beacon programming, directs beacon transmit/receive operations, integrates beacon component, and sets power level, data rate and transmit/receive duration;
   one or more tunable antennas that can be tuned for efficiency and sensitivity for transmitting and receiving signals, said one or more tunable antennas being two or more separate antennas, with at least one transmit antenna and at least one receive antenna, or a unified transmit/receive antenna;
   one or more matching-tuning network situated between the RF module and each tunable antenna, that tunes power, efficiency and sensitivity of the antenna using controller input; and
   tunable power levels, wherein tuning the power level will adjust the beacon transmit or receive range for the beacon;
   one or more sensors, said sensors transmitting and receiving data using radio transmission and
   one or more radio frequency receiving device having application programming to receive radio frequency signals from the radio frequency location and/or proximity beacon, said radio frequency receiving device receives presence, location and proximity signals transmitted from said radio frequency location and/or proximity beacon, and said radio frequency receiving device relays presence, location and proximity data received from the radio frequency location and/or proximity beacon to the first computer server.

12. The communication system according to claim 11 wherein the radio frequency receiving device is a computer, tablet computer, pad computer, laptop computer, mobile phone, handheld mobile device, or a dedicated radio frequency receiving device.

13. The communication system according to claim 11 further comprising:
   a base-station transceiver unit coupled to the home network that can receive transmissions from said one or more beacon.

14. The communication system according to claim 11 further comprising:
   a second computer server on a foreign network, said second computer server being coupled to said radio frequency receiving device, said radio frequency receiving device being coupled to a second gateway server for communication outside the foreign network and said radio frequency receiving device receives radio transmitted signals from one or more beacon, each of said one or more beacon being associated with a field asset and said radio frequency receiving device using said radio transmitted signals transmitting tracking, location and status information signals that are communicated to the first computer server on the home network.

15. The communication system according to claim 11 wherein said location and/or proximity beacon has a GPS module, a GPS antenna and a GPS matching tuning network.

16. The communication system according to claim 11 wherein said location and/or proximity beacon has one or more power amp for power amplification or de-amplification capabilities, said power amp controlled by programed controller logic, switch activation, or receipt of instructions.

17. The communication system according to claim 11 wherein said location and/or proximity beacon has one or more switch for power, light, sound, signaling and combinations thereof, said one or more switch capable of being controlled by said central controller.

18. The communication system according to claim 11 wherein the radio frequency module transmission utilizes one or more wireless personal area network (WPAN), wireless local area network (WLAN) or wireless wide area network (WWAN) radio frequency communication standards at the physical layer.

19. The communication system according to claim 11 wherein the radio frequency module transmission utilizes standards based radio frequency communication, wherein the standards based radio frequency communication is one or more of Bluetooth, LoRa, Wireless USB, WiFi, UWB, and ZigBee.

20. A method of transmitting communications regarding a radio frequency beacon for tracking location and/or proximity of field assets, comprising the steps of:
   providing a first computer server on a home network, said first computer server coupled to a first database and a first gateway, said first computer server having one or more hardware data processors;
   supporting communications to and from the home network using said first gateway server;
   providing one or more radio frequency location and/or proximity beacon associated with one or more stationary or moveable field asset,
      one or more radio frequency module that transmits and receives information via radio frequency signals, said radio frequency module having a transmission portion that transmits presence information including date, time and a unique beacon ID, location and/or proximity data, said location data including latitude, longitude and altitude, and said proximity data being detection of other beacons in range, and a receive portion that receives programming instructions and/or detection of other devices in proximity to the beacon, wherein programming instructions are received from an integrated device and/or cloud environment, said programming instructions being new programing, updates to existing programming, or initiation of prior programmed tasks;

a central controller that holds beacon programming, directs beacon transmit/receive operations, integrates beacon components, and sets power level, data rate and transmit/receive duration;

one or more tunable antennas that can be tuned for efficiency and sensitivity for transmitting and receiving signals, said one or more tunable antennas being two or more separate antennas, with at least one transmit antenna and at least one receive antenna, or a unified transmit/receive antenna;

one or more matching-tuning network situated between the RF module and each tunable antenna, that tunes power, efficiently and sensitivity of the antenna using controller input;

tunable power levels, wherein tuning the power level will adjust the beacon transmit or receive range for the beacon; and one or more sensors, said sensors transmitting and receiving data using radio transmission;

providing a radio frequency receiver device that has application programming to receive transmissions from the beacon, said radio frequency receiving device is a computer, tablet computer, pad computer, laptop computer, mobile phone, handheld mobile device, or a dedicated radio frequency receiving device;

receiving, by said radio frequency receiver device, radio frequency transmitted signals from the beacon, relaying beacon transmission received by the radio frequency receiver device to the first computer server, and storing received transmissions in said database.

21. The method of claim 20 further comprising:

providing a base-station transceiver unit coupled to the home network that can receive transmissions from said one or more beacon.

22. The method of claim 20 further comprising:

providing a second computer server on a foreign network, said second computer server being coupled to said radio frequency receiving device, said radio frequency receiving device being coupled to a second gateway server for communication outside the foreign network and said radio frequency receiving device receives radio transmitted signals from beacon, each of said one or more beacon being associated with one or more field asset and said radio frequency receiving device using said radio transmitted signals transmitting tracking, location and status information signals that are communicated to the first computer server on the home network.

23. The method of claim 20 wherein said location and/or proximity beacon has a GPS module, a GPS antenna and a GPS matching tuning network.

24. The method of claim 20 wherein said location and/or proximity beacon has one or more power amp for power amplification or de-amplification capabilities, said power amp controlled by programed controller logic, switch activation, or receipt of instructions.

25. The method of claim 20 wherein the radio frequency module transmission utilizes one or more wireless personal area network (WPAN), wireless local area network (WLAN) or wireless wide area network (WWAN) radio frequency communication standards at the physical layer.

* * * * *